(12) United States Patent
Stenbom

(10) Patent No.: US 11,679,509 B2
(45) Date of Patent: *Jun. 20, 2023

(54) PORTIONING DEVICE AND A METHOD FOR PACKAGING OF FOOD PRODUCTS

(71) Applicant: ROBOT GRADER AKTIEBOLAG, Molndal (SE)

(72) Inventor: Sverre Stenbom, Sjodalen (SE)

(73) Assignee: ROBOT GRADER AKTIEBOLAG, Mölndal (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/528,994

(22) Filed: Nov. 17, 2021

(65) Prior Publication Data

US 2022/0072714 A1 Mar. 10, 2022

Related U.S. Application Data

(62) Division of application No. 16/348,893, filed as application No. PCT/EP2017/079328 on Nov. 15, 2017, now Pat. No. 11,207,782.

(30) Foreign Application Priority Data

Nov. 15, 2016 (SE) .................................... 1651491-1

(51) Int. Cl.
*B25J 11/00* (2006.01)
*B25J 9/00* (2006.01)
(Continued)

(52) U.S. Cl.
CPC ......... *B25J 11/0045* (2013.01); *B25J 9/0093* (2013.01); *B25J 9/0096* (2013.01);
(Continued)

(58) Field of Classification Search
CPC .... B25J 11/0045; B25J 9/0093; B25J 9/0096; B25J 11/0055; B25J 15/0019;
(Continued)

(56) References Cited

U.S. PATENT DOCUMENTS 2,546,346 A * 3/1951 Oates .................... A22C 25/142
452/180
2,959,810 A * 11/1960 Cameron ............. A22C 25/142
452/170
(Continued)

FOREIGN PATENT DOCUMENTS

EP 1792831 A1 6/2007
EP 2174551 A1 4/2010
(Continued)

OTHER PUBLICATIONS

Swedish Office Action for Patent Application No. 1850569-3, dated Feb. 4, 2020, 5 pages.
(Continued)

*Primary Examiner* — Dariush Seif
(74) *Attorney, Agent, or Firm* — Johnson, Marcou, Isaacs & Nix, LLC; George Marcou, J.D.; Jennifer S. Stachniak, J.D.

(57) ABSTRACT

The invention relates to a portioning device for packaging of food products (3) in a portion carrier, comprising positioning device and gripping device (1), which gripping device comprises first and second articulating jaws (12*a*, 12*b*) having first and second ends that together with a belt or table (5) for a food product (3) define an opening between said jaws (12*a*, 12*b*) arranged to grip the food product laying on the belt or table (5), wherein said first and second jaws (12*a*, 12*b*) are articulately arranged in order to be movable between at least two relative positions, one holding position and one open position, wherein the portioning device also comprises a cutting device (2) arranged at said first and/or
(Continued)

second ends of said first and second articulating jaws (12a, 12b), and wherein said cutting device (2) is arranged to use the belt/table (5) as support for cutting. The invention also relates to a method for packaging of food products by use of the portioning device.

24 Claims, 6 Drawing Sheets

(51) Int. Cl.
| | |
|---|---|
| *B25J 15/00* | (2006.01) |
| *B25J 15/02* | (2006.01) |
| *B65B 5/08* | (2006.01) |
| *B65B 25/00* | (2006.01) |
| *B65B 35/36* | (2006.01) |

(52) U.S. Cl.
CPC ....... *B25J 11/0055* (2013.01); *B25J 15/0019* (2013.01); *B25J 15/0206* (2013.01); *B65B 5/08* (2013.01); *B65B 25/001* (2013.01); *B65B 35/36* (2013.01)

(58) Field of Classification Search
CPC ...... B25J 15/0206; B65B 5/08; B65B 25/001; B65B 35/36; A22C 25/142; A22C 25/14
USPC .............................................. 53/435; 452/64
See application file for complete search history.

(56) References Cited

U.S. PATENT DOCUMENTS

| | | | | |
|---|---|---|---|---|
| 3,469,278 A * | 9/1969 | Oates | ............... | A22C 25/142 452/119 |
| 3,793,675 A * | 2/1974 | Hogan | ............... | A22C 25/142 452/119 |
| 3,838,478 A * | 10/1974 | Wulff | ............... | A22C 25/08 452/119 |
| 3,919,741 A * | 11/1975 | Backhaus | ............... | A22C 25/142 452/170 |
| 3,972,091 A * | 8/1976 | Dohrendorf | ............... | A22C 25/142 452/170 |
| 4,041,672 A * | 8/1977 | Gularte | ............... | B65G 17/323 53/399 |
| 4,155,281 A * | 5/1979 | Kobayashi | ............... | A22C 25/145 83/59 |
| 4,291,436 A * | 9/1981 | Wulff | ............... | A22C 25/147 452/116 |
| 4,321,729 A * | 3/1982 | Ollik | ............... | A22C 25/142 452/170 |
| 4,599,765 A * | 7/1986 | Kristinsson | ............... | A22C 25/142 452/170 |
| 4,800,626 A * | 1/1989 | Wastell | ............... | A22C 25/145 452/183 |
| 4,976,011 A * | 12/1990 | Ogawa | ............... | A22C 25/14 452/110 |
| 4,993,116 A * | 2/1991 | Urushibara | ............... | A22C 25/145 452/116 |
| 5,026,318 A * | 6/1991 | Jahnke | ............... | A22C 25/14 452/116 |
| 5,032,105 A * | 7/1991 | Gronbech | ............... | A22C 25/142 452/108 |
| 5,083,972 A * | 1/1992 | King | ............... | A22C 25/145 452/108 |
| 5,352,152 A * | 10/1994 | Claudon | ............... | A22C 25/14 452/121 |
| 5,378,194 A * | 1/1995 | Hjorth | ............... | A22C 25/14 452/157 |
| 5,458,535 A * | 10/1995 | Bullock | ............... | A22C 25/142 452/64 |
| 5,554,069 A * | 9/1996 | Burch | ............... | A22C 25/145 452/149 |
| 5,735,735 A * | 4/1998 | Hahn | ............... | A22C 25/145 452/119 |
| 6,183,356 B1* | 2/2001 | Middleton | ............... | A22C 25/08 452/65 |
| 6,688,962 B1* | 2/2004 | Ketels | ............... | A22C 25/142 452/163 |
| 7,056,202 B2* | 6/2006 | Pein | ............... | A22C 25/142 452/108 |
| 8,834,238 B2* | 9/2014 | Ryan | ............... | A22C 25/142 452/170 |
| 10,561,153 B2* | 2/2020 | Tobias Granado | ............... | A22C 21/0046 |
| 10,653,158 B2* | 5/2020 | Pein | ............... | A22B 7/005 |
| 2004/0072525 A1* | 4/2004 | Pein | ............... | A22C 25/142 452/119 |
| 2004/0203331 A1* | 10/2004 | Grobeholz | ............... | A22C 25/147 452/106 |
| 2010/0048115 A1* | 2/2010 | Shimachi | ............... | A22C 25/14 452/149 |
| 2011/0207388 A1* | 8/2011 | Hansen | ............... | B25J 11/0045 452/121 |
| 2012/0086226 A1* | 4/2012 | Weber | ............... | B25J 15/0014 294/81.54 |
| 2013/0074667 A1* | 3/2013 | Weber | ............... | B25J 11/0045 83/72 |
| 2014/0227953 A1* | 8/2014 | Kowalski | ............... | A22C 25/14 452/135 |
| 2015/0004892 A1* | 1/2015 | Taniguchi | ............... | A22C 17/004 452/187 |
| 2019/0270205 A1* | 9/2019 | Sten | ............... | B65B 35/36 |

FOREIGN PATENT DOCUMENTS

| | | |
|---|---|---|
| FR | 2623738 A1 | 6/1989 |
| GB | 222621 A | 10/1924 |
| JP | S63317019 A | 12/1988 |
| JP | 2001095348 A | 4/2001 |
| SE | 1651491 A1 | 5/2018 |
| WO | 9913731 A1 | 3/1999 |
| WO | 2005106405 A1 | 11/2005 |
| WO | 2018091533 A1 | 5/2018 |

OTHER PUBLICATIONS

International Search Report and Written Opinion for PCT/EP2017/079328, dated Mar. 13, 2018, 16 pages.
"Non-Final Office Action for U.S. Appl. No. 16/348,893", dated May 11, 2021, 22 pages.
European Office Action for European Patent Application No. 17803870.9, dated Sep. 28, 2022, 6 pages.

\* cited by examiner

PORTIONING DEVICE AND A METHOD FOR PACKAGING OF FOOD PRODUCTS

CROSS REFERENCE TO RELATED APPLICATIONS

This application claims the benefit of priority to and is a divisional of co-pending U.S. patent application Ser. No. 16/348,893 filed May 10, 2019, entitled "A Portioning Device and a Method for Packaging of Food Products", which was the 35 U.S.C. § 371 national stage of International Application No. PCT/EP2017/079328 filed on Nov. 15, 2017, published in English under PCT Article 21(2), which claims the benefit of priority to Swedish Patent Application No. 1651491-1 filed on Nov. 15, 2016, the entire contents of each of which are hereby expressly incorporated herein by this reference including, without limitation, the specification.

TECHNICAL FIELD OF THE INVENTION

The present invention relates to a portioning device for packaging of food products, which portioning device comprises positioning device and gripping device. The invention also relates to a method for packaging of food products.

BACKGROUND ART

When packaging soft food products, such as fresh chicken, fish and other meat products, in portion carriers, it is important to obtain a well-packed portion carrier with a pleasant visual appearance. Packaging of such products may take place manually, i.e. operators/sorters standing along a conveyor package them manually. However, it is also important that the packaging process is fast and efficient. Therefore, automatized arrangements for packaging of soft food products have been developed, in which arrangements the food may be delivered to suitable portion carriers by device of packaging robots. Such packaging robots usually include a claw, which holds the food product during transportation to the portion carrier. When the claw is positioned above the portion carrier into which the food product shall be delivered, the claw is opened and the food product falls into the portion carrier.

EP 1,792,831 describes a method and a portioning device that enable controlled positioning of the food product in the portion carrier. This is accomplished by the food product being moved from the gripping device to a space defined by the gripping device. This is achieved by the gripping device being positioned such that at least parts of it is at a level below the top surface of a first food product which has already been placed at said portion carrier. Hence, the space in the portion carrier is efficiently utilized. The result is a closely packed portion carrier.

From WO 2005/106,405 it is further known a method and portioning device for packaging of food products of varying sizes, where at least two food products are to be packaged in the same packaging to obtain a target weight of the packaging. The method comprises the steps of making an estimate of the quantity of each food product, registering the location of each food product on an object conveyor, moving each food product to a collection area, determining by device of a computer program whether a food product is to be moved to a portion carrier, and, if such move is determined, also determining to which portion carrier the food product is to be moved in order to accomplish the target weight, and moving the food product to the selected portion carrier.

The methods and devices of EP 1,792,831 and WO 2005/106,405 have the drawback that although the food products are closely packed and the target weight quite often may be obtained, they do not provide for downsizing of the food products. This may e.g. be required when there is a stream of food products on a conveyor belt, which products are not easily combined to obtain a given target weight, or when the food products include non-desired or non-appealing parts such as fat, veins, blood or bones. A separate cutting station is needed to deal with such problems, which adds complexity to the process and potentially gives increased costs.

As mentioned above, the use of cutting stations as such are known, e.g. as shown in EP 2174551, which is an example of a complex and costly solution. EP 2174551 relates to a cutting station for automatically separating non-consumable parts of fish, wherein the cutting station is a bulky unit including three different means for performing the actual cutting.

SUMMARY OF THE INVENTION

The object of the present invention is to suggest a solution to the issues mentioned above by providing an improved portioning device for packaging of food products, as well as an improved method.

The object according to the invention is achieved by a portioning device according to claim 1. The object is also achieved by a method as defined in claim 8. Preferred embodiments of the invention are defined in the dependent claims.

The portioning device comprises positioning device and gripping device, which gripping device comprises first and second jaws having first and second ends that together with a belt or table for a food product define an opening between said jaws, wherein said first and second jaws are articulately arranged in order to be movable between at least two relative positions, one holding position and one open position. According to the invention, the device also comprises cutting device arranged at said first and/or second ends of said first and second jaws.

The method comprises:
 i. gripping the food product laying on a belt or table, by device of gripping device having first and second articulately arranged jaws having first and second ends that together with said belt or table define an opening between said jaws, in order to hold said food product in a holding position;
 ii. raising the food product to be moved to a portion carrier by device of said gripping device;
 iii. moving said food product to the selected portion carrier and
 iv. releasing the food product to the portion carrier;

According to the method of the invention, a piece of the food product is cut off in conjunction with step "i" or step "ii" by a cutting device arranged at said first and/or second ends of said first and second jaws.

The present invention enables downsizing of a food product by cutting, in the same station and step as gripping of the food product for portioning to a portion carrier. This is achieved by the portioning device, in addition to positioning and gripping device, comprising cutting device arranged in conjunction with said gripping device. Thus, food products can be downsized to better fulfil a target weight of the portion carriers and/or non-desired parts such as fat, veins, blood or bones can be removed. In case the removed part of the food product is a desired part in terms of food quality, it can be portioned to another portion carrier to fulfil the target weight of that portion carrier.

Preferred embodiments of the invention include the possibility to cut the food product at an angle to improve its visual appearance. In one embodiment, the cutting device is arranged for a cutting angle of 30-60°, preferably about 40-50° and most preferred about 45°, in relation to the plane of a belt or a table on which the food product is laying. Thereby, a part of the underside of the food product, such as a chicken filet, can be cut off while it still looks whole from above. In another embodiment, the cutting device is pivotally arranged around an axis of rotation that is perpendicular to the plane of said belt or table, to an angle of about 30-60°, preferably 40-50° and most preferred about 45° in relation to the opening between the jaws. Thereby, the least appealing part of e.g. a left or right side chicken breast can be cut off.

The cutting device is arranged in conjunction with the gripping device and it preferably cuts in a direction transversal to said first and second jaws of the gripping device. According to one embodiment of the invention, the cutting device is mounted at and operable by a push rod, such as the push rod of a pneumatic cylinder. In other embodiments, the cutting device may be operated by an electrical motor, e.g. mounted to a pivoting member to form a pivoting knife blade or where cutting device is in the form of rotating knife blade that cuts by means of a circular movement. In still another embodiment, the cutting device is mounted at the first and second jaws, to form a pair of cutting scissors that is open in the open position of the first and second jaws and closed in the holding position of the first and second jaws.

The portioning device and the method of the invention may further include any or all aspects of the prior art documents EP 1,792,831 and WO 2005/106,405, which are hereby incorporated by reference. In particular, the positioning device may be arranged to position the gripping device in relation to a portion carrier such that at least parts of said gripping device are at a level below the top surface of at least one first food product which has already been placed at said portion carrier. Thereby, space is made for the food product beside a first food product in the portion carrier, whereby the space in the portion carrier is efficiently utilized and the result is a closely packed and attractive looking portion carrier essentially without any food product laying on top of the other.

Preferably, said gripping device further comprises ejector device, which ejector device are arranged in-between said first and second jaws. Such ejector device is movable between a first retracted holding position and a second ejected position. Furthermore, the jaws preferably form a hull like structure arranged to force the food product upwards in the gripping device to at least partly make contact with the ejector device, when closing around the food product. The articulately arranged jaws may also be articulately operable between at least three positions, one holding position and two open positions wherein the gripping device defines a larger space when positioned in a second open position, when a food product is to be enclosed in the gripping device when picked up from for example a conveyor belt, compared to the first open position, which defines an opening that is large enough for the food product to pass through. However, the opening is small enough to shape the food product to a desired shape, as it passes through the opening.

Other particular aspects of the prior art document EP 1,792,831 which are comprised herein, includes air nozzle device which provides an air stream directed towards the food product to be placed in said defined space at said portion carrier, in order to shape the food product to a desired shape when said food product is transferred from the gripping device to a portion carrier. Furthermore, the first and second jaws of the gripping device may further comprise foldable teeth in order to assist in the gripping of said food product.

BRIEF DESCRIPTION OF THE DRAWINGS

The invention will be described in more detail in the following with reference to the accompanying schematic drawings, which for the purpose of exemplification illustrate embodiments of the invention.

DETAILED DESCRIPTION OF PREFERRED EMBODIMENTS OF THE INVENTION

In the following, the present invention is described in detail in terms of being an improvement of the method and portioning device described in EP 1,792,831. It should however be understood that the invention is not limited thereto but can be used in any system for portioning food products to portion carriers.

Figure 1:
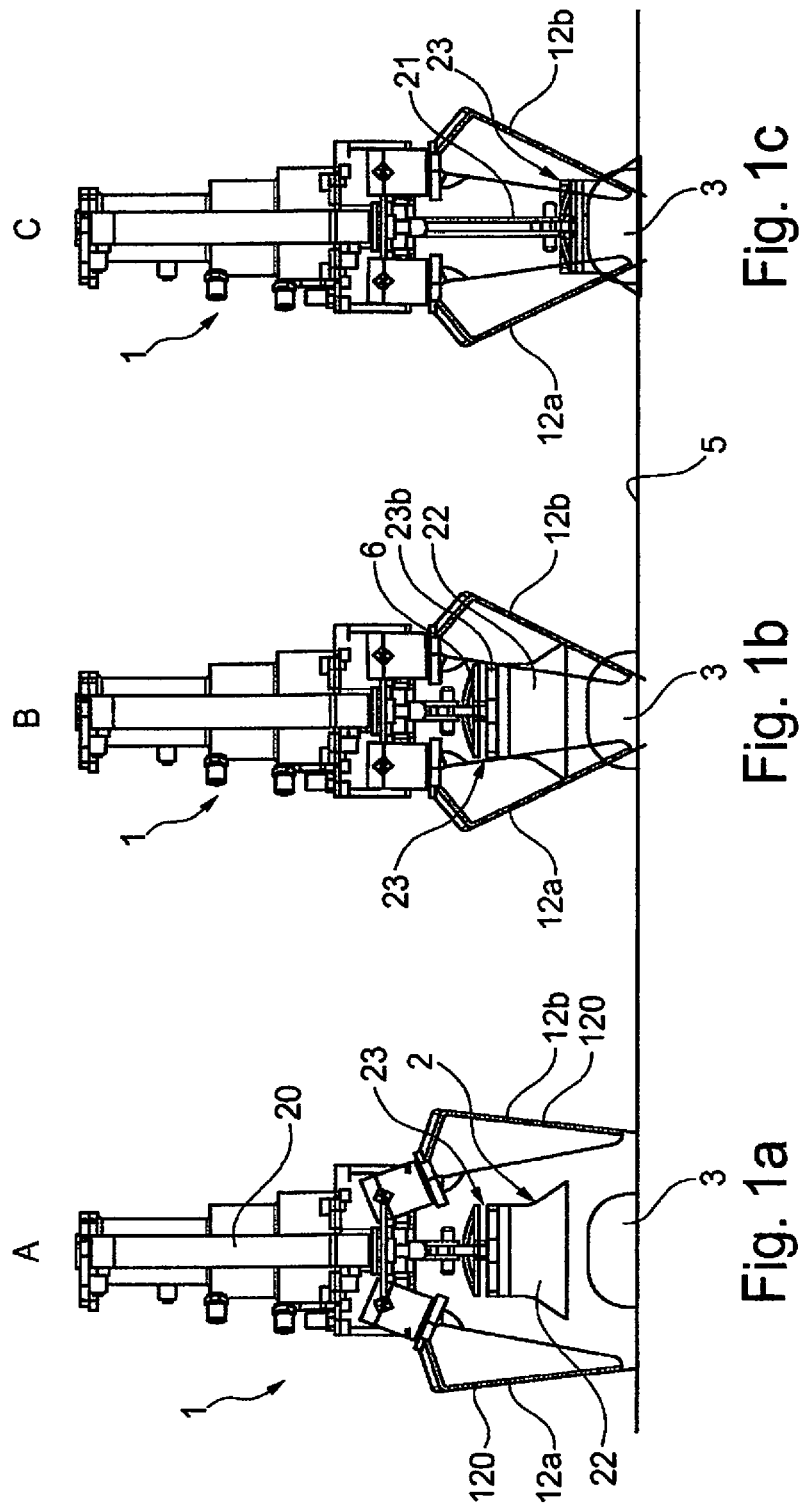
FIGS. 1a-1c are side views, in sequence showing a device and method according to the invention for cutting off a piece of a food product prior to the packaging thereof in a portion carrier.

Based on a robot gripper 1 as described in EP 1,792,831, using, preferably blade shaped, jaws 12a, 12b, forming a tunnel shaped space between their facing inner gripping surfaces, wherein the jaws 12a, 12b are pivotally arranged around one joint or two parallel pivot axis 28 (see FIG. 6b) extending in the same direction as the extension of the tunnel shaped space. A pusher device 6 may be arranged to safely hold an object 3. Along one of the side edges 120 of the jaws 12a, 12b there is a cutting device 2 mounted as shown in FIGS. 1a-c, in accordance with one embodiment according to the invention. The cutting device includes a (preferably pneumatic) cylinder 20, a push rod 21, the end of which a holding device 23 fixes a knife blade 22.

The knife 22 is mounted at the side of the robot gripper 1, with the blade oriented transversely to the extension of the tunnel shaped space, so that the blade 22 can cut off a part 3A of a chicken filet 3 (or other, e.g. tenderloin, fish head, etc.) projecting to the side from the gripper opening, by device of a downward movement of the knife blade 22. The cut may be performed using the belt/table 5 as support. The knife blade 22 will pass along the edge 120 of the jaws 12a, 12b and create a scissor like movement between the knife blade 22 and the blades of the jaws 12a, 12b ensuring that all fibers and/or sinew are completely cut. Alternatively, the cut is performed while the gripper 1 is moved upwards so that the knife can pass through the object 3 completely without touching the belt 5.

In FIG. 1a, the jaws 12a, 12b of the gripper 1 are in an open position and the knife 22 is in a retracted position as the push rod is retracted in the cylinder 20. In FIG. 1b, the jaws 12a, 12b have moved to a holding position, i.e. a position where they hold the chicken filet 3 that is lying on a conveyor belt or a table 5, while the knife 2 is still in a retracted position. In this position a part 3A of the chicken filet 3 may be arranged to protrude out from the tunnel shaped space delimited by the facing surfaces of the jaws 12a, 12b and one pair of opposing side edges 120 of said jaws 12a, 12b. In FIG. 1c, the push rod 21 is pushed out from the cylinder 20, moved, generally in parallel, along the side edges 120 and consequently the knife 2 is pushed through the chicken filet, to meet the belt or table 5, so that a piece 3A of the filet is cut off.

Figure 2:
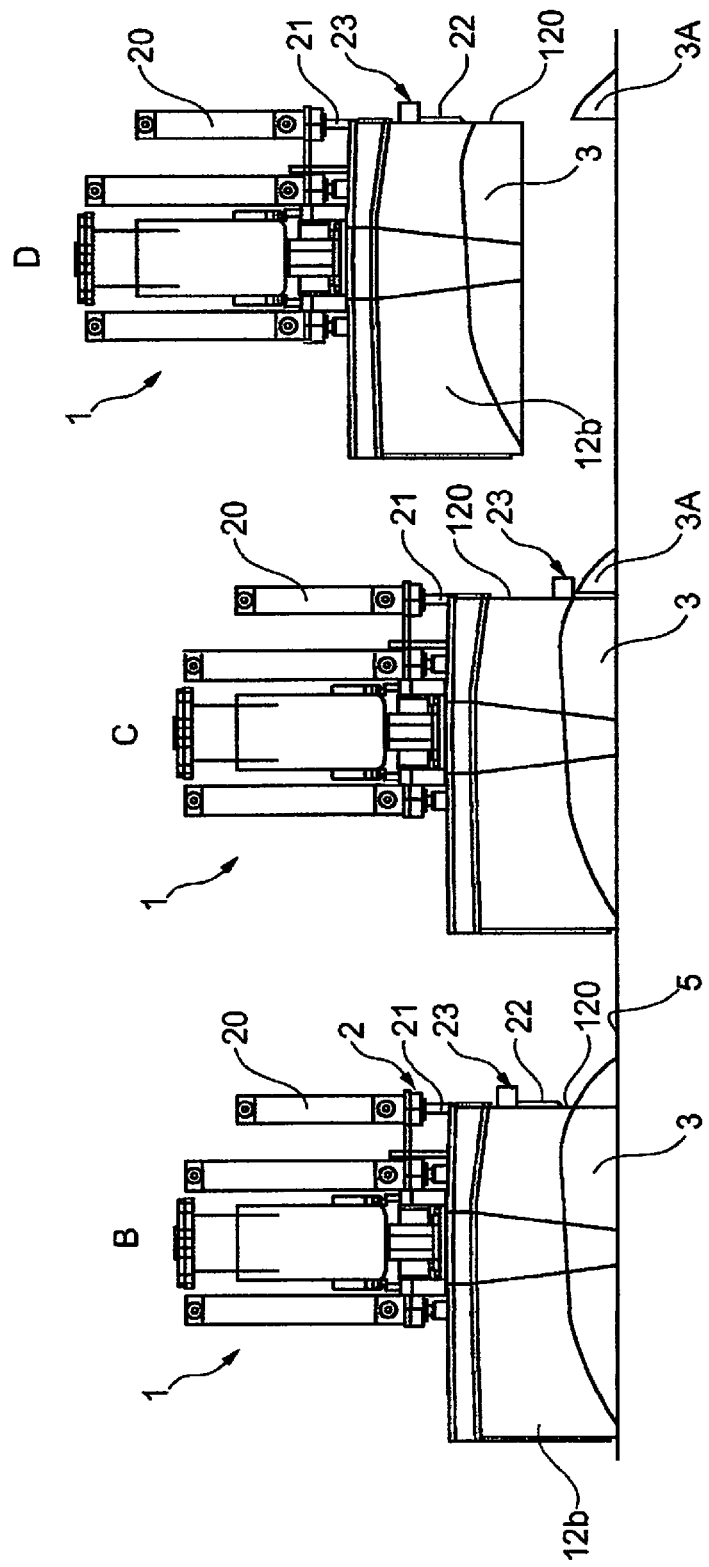
FIGS. 2a-2c are side views perpendicular to FIGS. 1a-1c, in sequence showing a device and method according to the invention for cutting off a piece of a food product prior to the packaging thereof in a portion carrier.

FIGS. 2a-c are perpendicular to FIGS. 1a-c. FIGS. 2a and 2b correspond to FIGS. 1b and 1c, respectively. FIG. 2c shows how the remaining, major part of the filet 3 is raised from the belt or table 5, by being held by the jaws 12a, 12b, while the cut off piece 3A of the filet, remains lying on the belt or table 5. The knife 2 has been retracted again. From the position shown in FIG. 2c, the filet 3 is portioned to a portion carrier (not shown) in a manner known per se, e.g. from EP 1,792,831.

Figure 3:
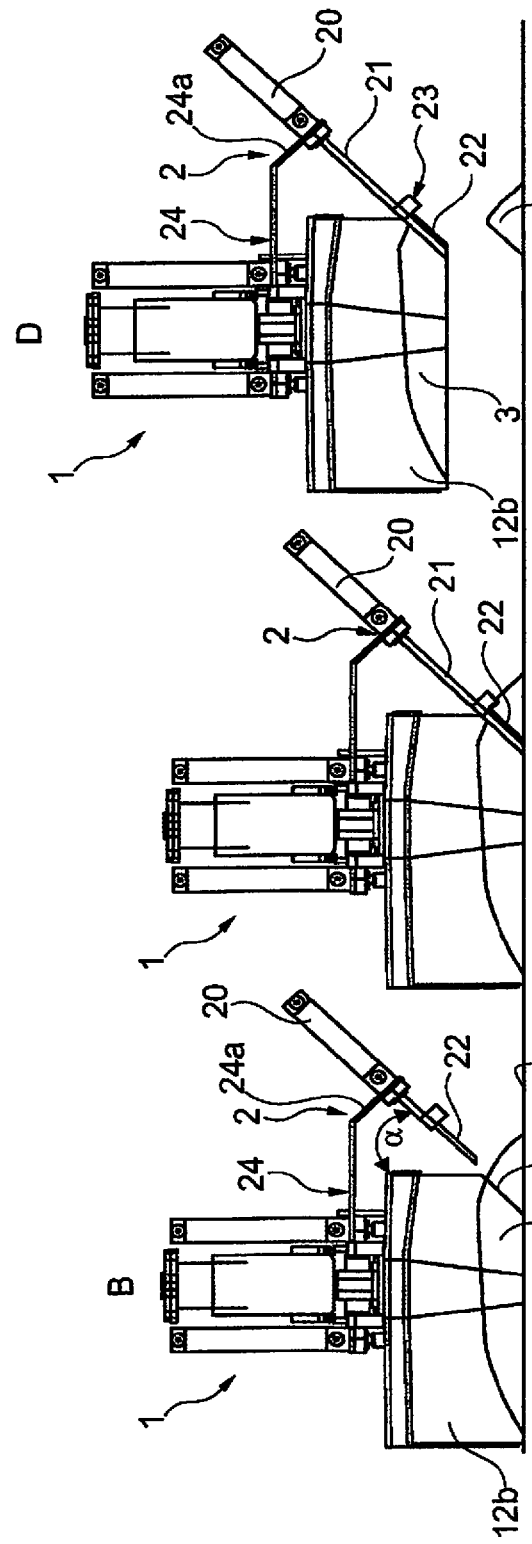
FIGS. 3a-3c are sequential side views showing a device and method according to a second embodiment of the invention.

According to FIGS. 3a-c there is shown a second embodiment of the invention in which the angle α of the cut is acute in relation to the belt or table 5, preferably by the cutting device 2 being attached to the gripping device by an arm 24 having a bent outer portion 24a where the knife 2 is attached. (For chicken filets, such a cut is today traditionally done in a separate, external cutting machine.) By attaching the knife 2 and thereby also the blade 22 at an angle α, preferably 30-60°, more preferred 40-50° and most preferred about 45°, a portion of the underside of the product is cut away, presenting as small an incision as possible. Thus, the product may then look whole and completely natural from above. In this embodiment, the jaws 12a, 12b have beveled lower side edges 121, to provide for the angled movement of the knife. Although not shown, the arm 24 may alternatively be arranged to be adjustable, e.g. in the transition between the inner part of the arm 24 and the outer arm portion 24a, such that the desired angle α in relation to the belt or table 5 can be adjusted. Preferably this adjustment mechanism is a simple mechanical solution that manually can be quickly and easily adjusted, i.e. releasably fixated, to use the same setting during a process sequence, whereby cost and weight is kept low. However, it is evident that also remotely controlled adjustment mechanisms may be used, depending on needs.

Figure 4:
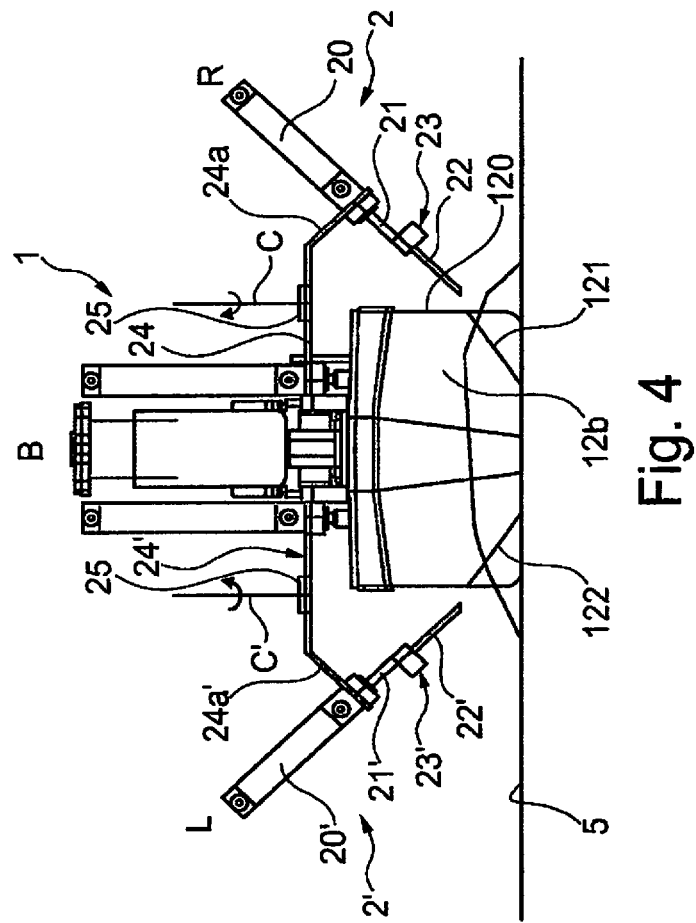
FIG. 4 is a side view showing a device and method according to a third embodiment of the invention.
Figure 5:
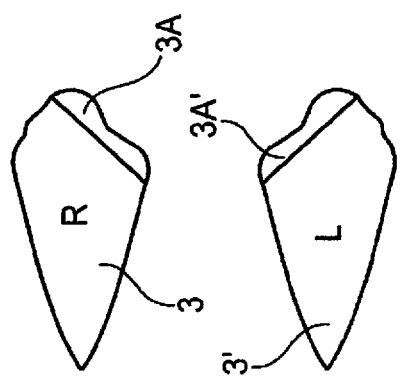
FIG. 5 is a top view showing left and right chicken filets cut by the a device and method shown in FIG. 4.

In a third embodiment of the improved gripper, as shown in FIGS. 4 and 5, food products, of essentially mirrored conformation, such as right and left chicken breast filets 3, can be cut in different ways. Here, there is arranged an adjusting device 25 presenting a vertical axis of rotation C, around which the outer portion of the arm 24a and thereby the cutting device 2 may be rotated, preferably 30-60°, more preferred 40-50° and most preferred about 45° in both directions, to enable cutting away different parts (than that described above), e.g. the least appealing part 3A of the filets presented in FIG. 5. Preferably, two cutting devices 2 (Right), 2' (Left) are arranged, one at each end of the beveled jaws 12a, 12b, each one in line with a respective beveled lower side edge 121, 122 of one of the jaws 12b. The robot may then be programmed to detect whether the filet 3 is of right R or left L conformation, possibly rotates the gripper 1 to grip the filet the correct way, then grips it and activates the cutting device 2 or 2' on that side of the gripper 1 that cuts off the desired piece 3A. FIG. 5 shows a right filet R, which is to be cut with the cutting device marked 2. If thereafter next filet 3 to be gripped is identified as a left filet L, the robot gripper will rotate 180° to grab it and then apply the cutting device marked 2'. It is evident for the skilled person that the shown cutting lines in FIG. 5 are as examples only, i.e. that the cutting line may be varied depending on desire/need in different applications.

Alternatively, (not shown), a line with more than one robot gripper 1 is equipped with two versions of the cutting device 2. The first robot gripper 1 may have a right-mounted cutting device 2 and it will cut and pack the right filets R only and the second robot gripper 1 may have a left-mounted cutting device 2' and it will cut and pack left filets L only.

Figure 6:
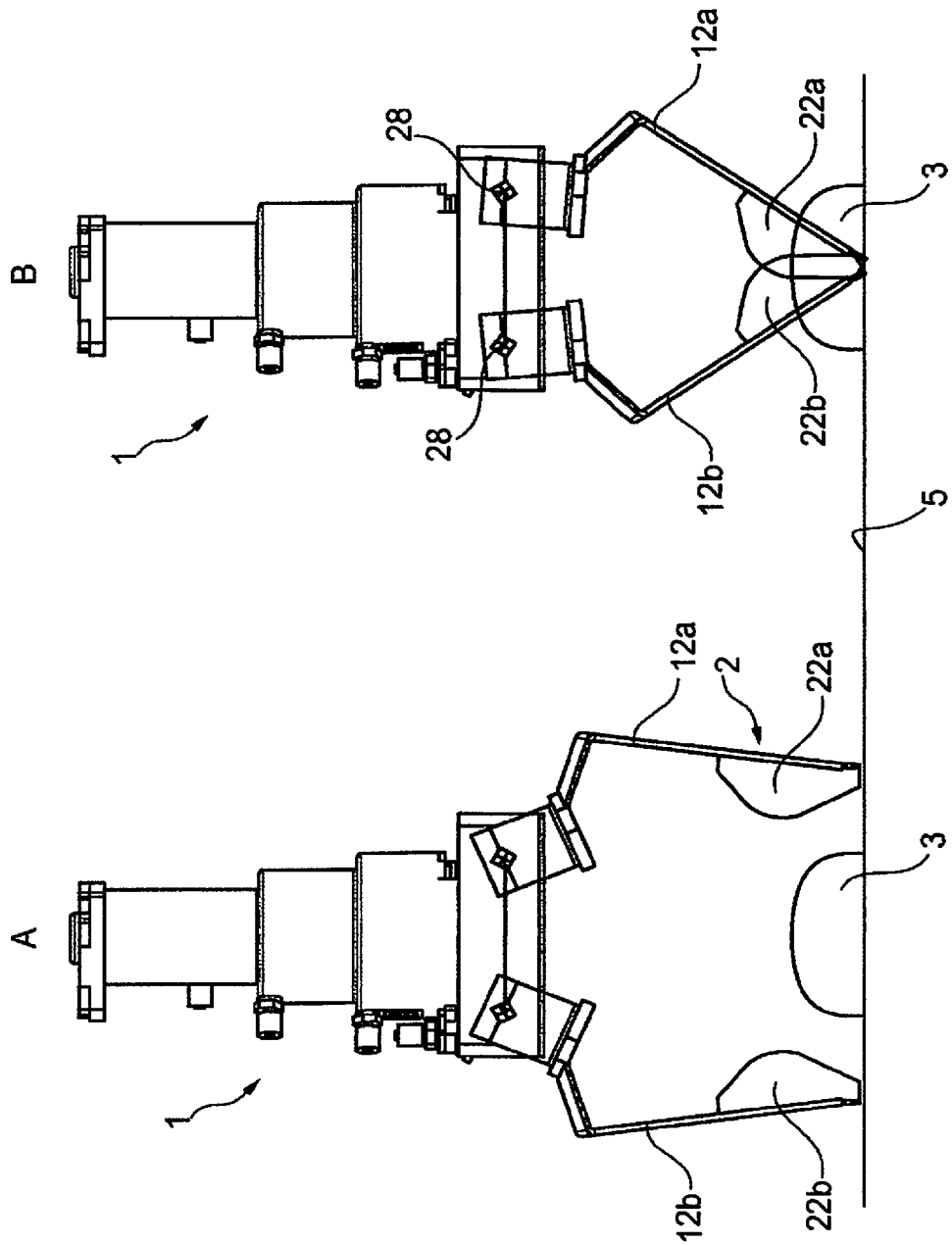
FIGS. 6a-6b are side views in sequence showing a device and method according to a fourth embodiment of the invention.

Several knife arrangements can be contemplated, depending on the product to be cut. FIGS. 6a-b show a knife 2 of scissor type, having two knife blades 22a, 22b attached to and oriented transversely to the inner surfaces of the jaws 12a, 12b, facing each other, so that the knife blades 22a, 22b will cut the part 3A of a chicken filet 3 (or similar) projecting to the side, by scissor action simultaneously with the moving of the jaws 12a, 12b into the holding position.

Figure 7:
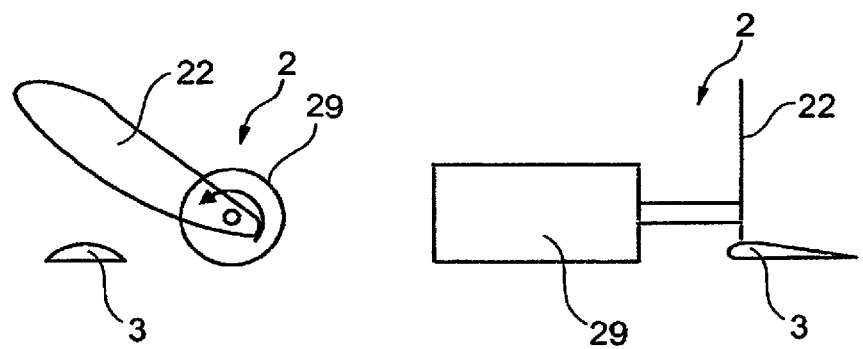
FIG. 7 that schematically shows two perpendicular side views of a cutting device that may be operated by an electrical motor mounted to a pivoting member to form a pivoting knife blade; and, FIG. 8 that schematically shows two perpendicular side views of a cutting device that may be operated by an electrical motor wherein the cutting device is in the form of rotating knife blade that cuts by means of a circular movement.

FIG. 7 schematically shows two perpendicular side views of an alternate cutting device 2 that may be operated by an electrical motor 29 mounted to a pivoting shaft member transforming a pivoting movement to a pivoting knife blade 22, which may be straight or equipped with an appropriate curvature of its edge adapted to the object 3 to be cut.

Figure 8:
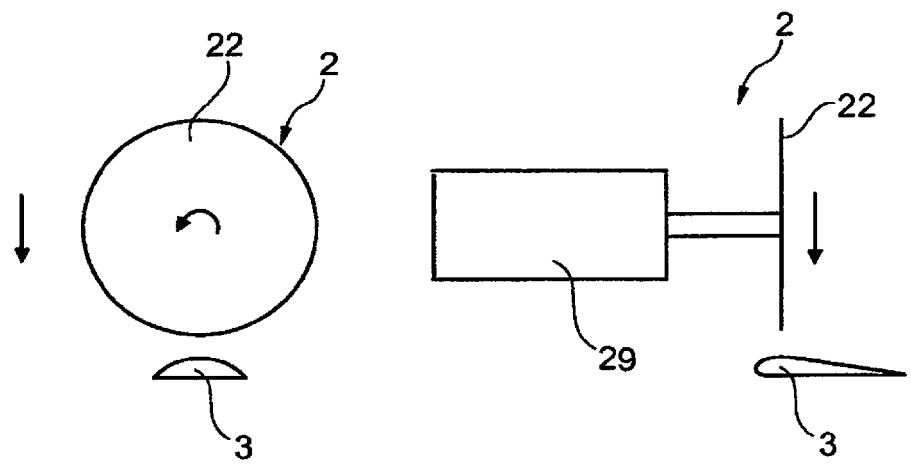

FIG. 8 schematically shows two perpendicular side views of a further embodiment of cutting device 2 that may be operated by an electrical motor 29 wherein the cutting device 2 is in the form of rotating knife blade 22 that cuts by means of a circular movement, which may minimize the force needed for the movement of the knife 2 to cut through a product 3.

The cut off piece 3A of the food product may remain on a conveyor belt and can be picked up by the robot at the next cycle, to be packaged in a different packaging to achieve the target weight thereof. For example, if the target weight of the packaging is 120 g and the incoming food products have an average weight of 80 g, then 40 g on average can be cut off and combined with a whole filet to fulfil a target weight of 120 g. Another option is for the cut off part to be transferred to another food handling step such as shredding or similar.

Yet another option may be that the robot lifts the whole filet from the belt and moves to one of several possible positions, to cut the excess weight. Depending on the weight or other sorting criteria such as the presence of fat, blood or bones, it can cut non-identical portions in the different positions, to then be used for various further processes.

Yet another option may be to arrange a fixed cutting blade/edge (not shown) on the table 5 and that the knife blade 22 moves a little further down than the bottom of the jaws 12a, 12b in cooperation with the fixed cutter blade to achieve a scissors effect ensuring that all fibers, tendons, bones, etc. are entirely cut. In many applications, there is no need of a fixed blade. Further, mostly it is not a problem if the knife blade 22 touches the table/belt 5. For example, tender products, e.g. boiled fish, can be cut with a plastic edge that does not wear on the belt. For example, a steel belt 5 combined with a plastic knife blade 22 will work well on light cut products.

Yet another option may be to arrange the belt to include several segments (not shown) that form gaps at each transition. The robot 1 will know where the gap is and where the product is such that it can go down when the file goes over the gap at the right time so that the knife can cut down into the gap formed by the two belt segments. This may also enable use of the eccentric blades, which may operate with great power and high speed, resulting in fine cuts.

The invention is not limited to the shown embodiments but may be varied within the scope of the claims.

The invention claimed is:

1. A portioning device for packaging of food products (3) in a portion carrier, comprising;
    a positioning and gripping device (1), wherein the gripping device comprises first and second jaws (12a, 12b) having first and second ends that together with a belt or table (5) for a food product (3) define an opening between said jaws (12a, 12b) arranged to grip the food product laying on the belt or table (5), wherein said first and second jaws (12a, 12b) are arranged in order to be movable between at least two relative positions, one holding position and one open position; and
    a cutting device (2) arranged at said first and/or second ends of said first and second jaws (12a, 12b), and wherein said cutting device (2) is arranged to use the belt/table (5) as support for cutting and to pass along an edge (120, 121, 122) of the first and second jaws (12a, 12b) to perform a cut.

2. The portioning device according to claim 1, wherein the cutting device (2) is arranged to perform the cut while the gripping device (1) is moved upwards.

3. The portioning device according to claim 1, wherein said cutting device (2) comprises a knife blade (22) arranged to cut along a plane that is substantially parallel to the edge (120, 121, 122) of at least one of said jaws (12a, 12b).

4. The portioning device according to claim 1, wherein said cutting device (2) is arranged to cut in a direction at an angle (a) to a plane of said belt or table (5) at an angle of about 30-60° to the plane of said belt or table.

5. The portioning device according to claim 4, wherein said cutting device (2) is releasably fixedly adjustable by means of mechanical means (25) in different positions.

6. The portioning device according to claim 1, wherein said cutting device (2) is arranged to cut in a direction at an angle (a) to a plane of said belt or table (5) at an angle of 40-50° to the plane of the belt or table.

7. The portioning device according to claim 1, wherein said cutting device (2) is arranged to cut in a direction at an angle (a) to a plane of said belt or table (5) at an angle of about 45° to the plane of said belt or table.

8. The portioning device according to claim 1, wherein said cutting device (2) is pivotally arranged around a vertical axis of rotation (C) that is perpendicular to the plane of said belt or table (5), up to an angle of about 40-50° in relation to said opening between said jaws (12a, 12b).

9. The portioning device according to claim 8, wherein said cutting device (2) is pivotally arranged around a vertical axis of rotation (C) that is perpendicular to the plane of said belt or table (5), up to an angle of about 30-60°.

10. The portioning device according to claim 1, wherein said cutting device (2) is pivotally arranged around a vertical axis of rotation (C) that is perpendicular to the plane of said belt or table (5), up to an angle of about 40-50° in relation to said opening between said jaws (12a, 12b).

11. The portioning device according to claim 1, wherein said cutting device (2) is pivotally arranged around a vertical axis of rotation (C) that is perpendicular to the plane of said belt or table (5), up to an angle of about 45° in relation to said opening between said jaws (12a, 12b).

12. The portioning device according to claim 1, wherein said cutting device (2) is mounted at and operable by a push rod (21) to perform a linear motion.

13. The portioning device according to claim 1, wherein said cutting device (2) comprises a pair of cutting scissors (22a, 22b) mounted at said first and second jaws (12a, 12b), wherein the cutting scissors is open in said open position of said first and second jaws and closed in said holding position of said first and second jaws.

14. The portioning device according to claim 1, wherein said positioning device is arranged to position said gripping device (1) in relation to a portion carrier such that at least parts of said gripping device are at a level below the top surface of at least one first food product which has already been placed at said portion carrier.

15. A method for packaging of food products (3), comprising:
    i. gripping the food product (3) laying on a belt or table (5), by a gripping device (1) having first and second jaws (12a, 12b) having first and second ends that together with said belt or table (5) define an opening between said jaws (12a, 12b), in order to hold said food product (3) in a holding position;
    ii. raising said food product (3) to be moved to a portion carrier by said gripping device (1);
    iii. moving said food product (3) to the selected portion carrier; and
    iv. releasing said food product (3) to the portion carrier;
    wherein, in conjunction with step "i" or step "ii", further comprising downsizing a piece (3A) of said food product (3) to better fulfill a target weight of the portion carrier, wherein the downsizing comprises cutting off a piece (3A) of the food product (3) by a cutting device (2) arranged at said first and/or second ends (120) of said first and second jaws (12a, 12b), wherein the cutting device (2) is arranged to pass along an edge (120, 121, 122) of the first and second jaws (12a, 12b) to perform a cut.

16. The method according to claim 15, further comprising performing the cut while the gripping device (1) is moved upwards.

17. The method according to claim 15, wherein said food product (3) is cut in a direction transversal to said first and second jaws (12a, 12b).

18. The method according to claim 15, wherein said food product (3) is cut in a direction at an angle (a) to a plane of said belt or table (5) at an angle of about 30-60°.

19. The method according to claim 18, wherein before cutting off said piece (3A) of said food product (3), said cutting device is pivoted around an axis of rotation (C) that is perpendicular to the plane of said belt or table (5).

20. The method according to claim 15, wherein the food product (3) is cut in a direction at an angle (a) to a plane of the belt or table (5) of about 40-50° to the plane of the belt or table.

21. The method according to claim 15, wherein said cutting device (2) comprises one knife blade (22).

22. The method according to claim 15, wherein said cutting device (2) comprises a pair of cutting scissors (22a, 22b) that closes as said first and second jaws (12a, 12b) move into said holding position.

23. The method according to claim 15, wherein said cut off-piece (3A) of said food product (3) is portioned to another portion carrier to fulfill the target weight of that portion carrier.

24. The method according to claim 15, wherein downsizing comprises removing non-desired parts of the food product.

\* \* \* \* \*